United States Patent [19]
Matsuda

[11] Patent Number: 5,106,167
[45] Date of Patent: Apr. 21, 1992

[54] METHOD OF CONTROLLING HYDRAULIC BRAKING PRESSURE FOR VEHICLE

[75] Inventor: Shohei Matsuda, Saitama, Japan

[73] Assignee: Honda Giken Kogyo Kabushiki Kaisha, Tokyo, Japan

[21] Appl. No.: 601,092

[22] Filed: Oct. 22, 1990

[30] Foreign Application Priority Data

Oct. 24, 1989 [JP] Japan .................... 1-276391

[51] Int. Cl.⁵ ..................... B60T 7/00; B60T 8/32
[52] U.S. Cl. ..................... 303/15; 303/101; 303/117; 303/119 R; 303/93
[58] Field of Search ........... 303/101, 117, 119, 91, 303/93, 15, 3, 10, 13, 14, 113, 115, 116, 94–96, 100, 119 R, 116 R; 137/625.69; 251/129.03, 129.15; 60/545; 364/426.01, 426.02, 426.03

[56] References Cited

U.S. PATENT DOCUMENTS

| | | | |
|---|---|---|---|
| 4,327,414 | 4/1982 | Klein | 303/93 X |
| 4,365,847 | 12/1982 | Martin | 303/93 |
| 4,940,291 | 7/1990 | Sato | 303/119 X |

FOREIGN PATENT DOCUMENTS

62-258844  11/1987  Japan .

*Primary Examiner*—Douglas C. Butler
*Attorney, Agent, or Firm*—Armstrong & Kubovcik

[57] ABSTRACT

A method of controlling hydraulic braking pressure in a vehicle, wherein an electrically operated actuator produces a hydraulic braking pressure in response to an applying electricity level applied to the actuator, such that the hydraulic pressure increases as the applying electricity level increases, includes the steps of setting the applying electricity level in correspondence to an amount of braking operation, determining at least two types of electricity levels having larger and smaller variation rates with respect to a variation in an amount of braking operation, and changing the applying electricity level having the larger variation rate to an applying electricity level having the smaller variation rate, when the amount of braking operation is greater than or equal to a switchover set value.

3 Claims, 6 Drawing Sheets

METHOD OF CONTROLLING HYDRAULIC BRAKING PRESSURE FOR VEHICLE

BACKGROUND OF THE INVENTION

The present invention relates to a method of controlling the hydraulic braking pressure for a vehicle, in which an electricity level, to be applied to an electrically operated actuator which produces a hydraulic braking pressure that increases as the applying electricity level increases, is set in correspondence to the amount of braking operation.

Such methods of controlling the hydraulic braking pressure for a vehicle are conventionally known, for example, from Japanese Patent Application Laid-open No. 258844/87.

In the above conventional method, the electricity level applied to the electrically operated actuator is proportionally related to the amount of braking operation, so that the hydraulic braking pressure, which is increased in proportion as the amount of braking operation increases, is delivered from the actuator.

However, it is necessary to quickly raise the level of hydraulic braking pressure in accordance with the braking operation at the start of braking to promptly operate an operating portion in the brake device, but if the variation rate of hydraulic braking pressure relative to the amount of braking operation is maintained intact, a greater level of hydraulic braking pressure than necessary may be applied to the brake device, thus resulting in a reduction in durability of components of the brake device and in an unnecessary consumption of a working oil.

When an anti-lock control valve is interposed between an actuator and a brake device, if anti-lock control is to be conducted, the value is operated to decrease the hydraulic braking pressure of the brake device, it is unnecessary after the start of the anti-lock control to produce a hydraulic braking pressure more than the hydraulic braking pressure at the start of such control from the actuator. Increasing the hydraulic braking pressure produced from the actuator in accordance with the amount of braking operation during the anti-lock control will likewise cause a reduction in durability and an unnecessary consumption of a working oil.

SUMMARY OF THE INVENTION

The present invention has been accomplished in order to overcome the above disadvantages, and it is an object of the present invention to provide a method for controlling hydraulic braking pressure for a vehicle, wherein the variation rate of the hydraulic braking pressure from the actuator is varied in accordance with the braking condition to provide an improvement in durability and avoid any unnecessary consumption of the brake fluid (or working oil).

According to a first aspect of the present invention, in a method of controlling the hydraulic braking pressure for a vehicle in which an applying electricity level, to be applied to an electrically operated actuator which produces a hydraulic braking pressure that increases as the applying electricity level increases, is set in correspondence to the amount of braking operation, at least two types of applying electricity levels are set with different variation rates relative to a variation in amount of braking operation, so that the applying electricity level with the larger variation rate is changed to the applying electricity level with the smaller variation rate in response to the amount of braking operation becoming greater than or equal to a switchover set value.

In addition, according to a second aspect of the present invention, the switchover set value of the amount of braking operation is set such that it increases as the vehicle speed increases.

Further, according to a third aspect of the present invention, in a method of controlling the hydraulic braking pressure for a vehicle in which an anti-lock control valve is interposed between an electrically operated actuator, which produces a hydraulic braking pressure that increases as the applying electricity level increases, and a brake device mounted on a wheel and the value is adapted to be operated to decrease the braking pressure of the brake device in response to the wheel being about to be locked during braking, and an applying electricity level to be applied to the actuator is set in correspondence to the amount of braking operation, at least two types of applying electricity levels are set with different variation rates relative to a variation in amount of braking operation, so that the applying electricity level with the larger variation rate is changed to the applying electricity level with the smaller variation rate in response to the operation of the anti-lock control valve when the wheel is about to be locked.

After the start of a prompt operation of an operating portion of the brake device at an initial stage of the start of braking, it is possible to avoid application of any unnecessarily large hydraulic braking pressure to the brake device by applying the electricity level with the smaller variation rate relative to the amount of braking operation to the actuator.

According to the second aspect of the present invention, an inertia force at a higher vehicle speed is large as compared to that at a lower vehicle speed and hence, the switchover set value can be increased to change the amount of electricity applied to the actuator, thereby accommodating to the magnitude of the inertia force.

Further, according to the third aspect of the present invention, if the anti-lock control in which the anti-lock control valve is operated is started, it is unnecessary to greatly increase the hydraulic braking pressure. Therefore, any unnecessary increase in hydraulic braking pressure can be avoided by applying the electricity level with the smaller variation rate relative to the amount of braking operation to the actuator.

As discussed above, according to a first aspect of the present invention, at least two types of applying electricity levels are set with different variation rates relative to a variation in amount of braking operation, so that the applying electricity level with the larger variation rate is changed to the applying electricity level with the smaller variation rate in response to the amount of braking operation becoming greater than or equal to a switchover set value. Therefore, it is possible to avoid the application of any unnecessarily large hydraulic braking pressure to the brake device and thus to provide an improvement in durability of the brake device and present any unnecessary consumption of the brake fluid (or working oil).

According to a second aspect of the present invention, the switchover set value is set such that it increases as the vehicle speed increases. Therefore, it is possible to accommodate to a variation in inertia force with a variation in vehicle speed.

Further, according to a third aspect of the present invention, at least two types of applying electricity levels are set with different variation rates relative to a variation in amount of braking operation, so that the applying electricity level with the larger variation rate is changed to the applying electricity level with the smaller variation rate in response to the operation of the anti-lock control valve when the wheel is about to be locked. Therefore, it is possible to avoid any unnecessary increase in hydraulic braking pressure during the anti-lock control and thus to provide an improvement in durability of the braking device and prevent any unnecessary consumption of the brake fluid (or working oil).

BRIEF DESCRIPTION OF THE DRAWINGS

FIGS. 1 to 6 illustrate a first embodiment of the present invention, wherein

DETAILED DESCRIPTION OF THE PREFERRED EMBODIMENTS

The present invention will now be described with reference to the accompanying drawings.

Figure 1:
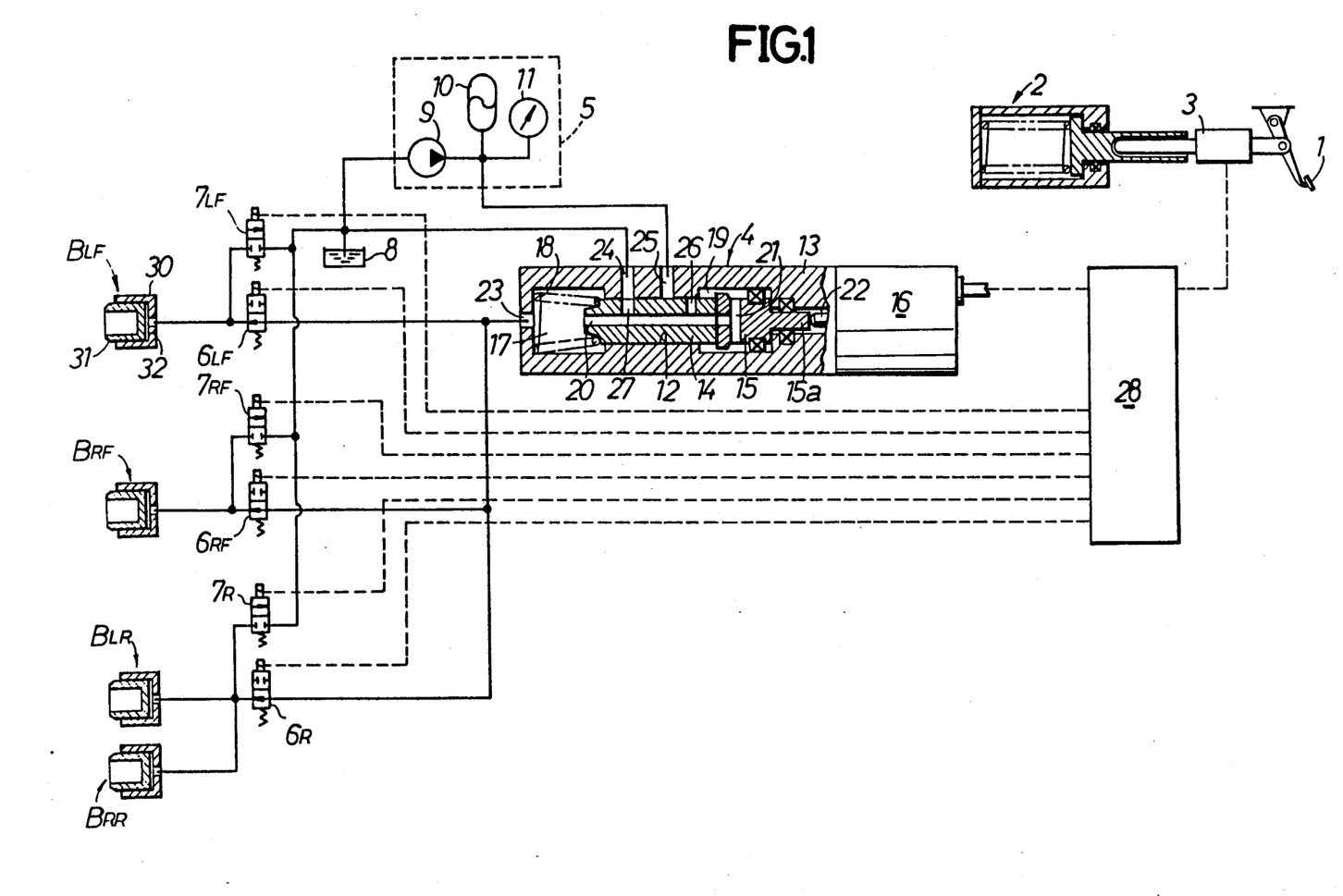
FIG. 1 is a schematic diagram of a hydraulic circuit of the first embodiment of the present invention.

Referring first to FIG. 1 showing a first embodiment of the present invention, a left front wheel brake device $B_{LF}$ and a right front wheel brake device $B_{RF}$ are mounted on left and right front wheels, respectively, and a left rear wheel brake device $B_{LR}$ and a right rear wheel brake device $B_{RR}$ are mounted on left and right rear wheels, respectively. A reaction force generating means 2 for providing a spring force opposing a force of depression of a brake pedal 1 is connected to the brake pedal 1 through a depression force sensor 3 for detecting an amount of braking operation. During normal braking, hydraulic pressure from a hydraulic pressure supply source 5 controlled by an electrically operated actuator 4 in accordance with the amount of braking operation detected by the depression force sensor 3 is applied to each of the front and rear wheel brake devices $B_{LF}$, $B_{RF}$, $B_{LR}$ and $B_{RR}$. The hydraulic braking pressure of each of the brake devices $B_{LF}$, $B_{RF}$, $B_{LR}$ and $B_{RR}$ can be maintained or reduced to effect an anti-lock control through normally-opened type solenoid inlet valves $6_{LF}$ and $6_{RF}$ and normally-closed type solenoid outlet valves $7_{LF}$ and $7_{RF}$ as anti-lock control valves which are mounted in independent association with the front wheel brake devices $B_{LF}$ and $B_{RF}$ as well as a normally-opened type solenoid inlet valve $6_R$ and normally-closed type solenoid outlet valve $7_R$ which are associated commonly with both rear wheel brake devices $B_{LR}$ and $B_{RR}$.

The hydraulic pressure supply source 5 comprises a hydraulic pump 9 for pumping a working oil from a reservoir 8, an accumulator 10 connected to the hydraulic pump 9, and a pressure switch 11 for controlling the operation of the hydraulic pump 9.

The electrically-operated actuator 4 comprises a housing 13 having a cylinder bore 12 closed at one end (a first end), a spool 14 slidably received in the cylinder bore 12, a reaction piston 15 slidably received in the cylinder bore 12 in abutment with the spool 14, and an electrically actuating portion 16 mounted on the opposite end (a second end) of housing 13 to provide an axial driving force for urging the reaction piston 15 toward one side.

An output chamber 17 is defined between one end of the spool 14 and one end wall of the cylinder bore 12, and a spring 18 is contained in the output chamber 17 for biasing the spool 14 toward the opposite end of the cylinder bore 12.

An annular output pressure applying chamber 19 is defined by an inner surface of the cylinder bore 12, the spool 14 and the reaction piston 15. A communication passage 20 extends axially through the entire length of spool 14 and leads to the output chamber 17. A communication hole 21 is provided in the reaction piston 15 for permitting the communication passage 20 to communicate with the output pressure applying chamber 19. Thus, the hydraulic pressure from the output pressure applying chamber 19 leading to the output chamber 17 is applied to the reaction piston 15 in the opposite direction (to the right as viewed in FIG. 1), and the spool 14 is moved by the spring force of the spring 18 while following the reaction piston 15.

The electrically actuating portion 16 contains a linear solenoid (not shown) which provides a driving force that corresponds to an electricity level applied thereto, and a drive rod 22 driven by the linear solenoid coaxially abuts against a piston rod 15a integrally provided on the reaction piston 15. Therefore, a driving force of the electrically actuating portion 16 is applied to the spool 14 in a first direction (toward the first end or to the left in FIG. 1), and the hydraulic pressure in the output pressure applying chamber 19 is applied to the spool 14 in a second direction (toward the second end or to the right in FIG. 1), so that the spool 14 may be moved by a balance of the solenoid driving force and the hydraulic pressure.

The housing 13 is provided with an output port 23 normally communicating with the output chamber 17, a release port 24 leading to the reservoir 8, and an input port 25 leading to the hydraulic pressure supply source 5. These ports are disposed in sequence from the first end.

On the other hand, the spool 14 is provided with a first valve bore 26 enabling communication between the input port 25 and the communication passage 20, and a second valve bore 27 enabling communication between the release port 24 and the communication passage 20. The arrangement of valve bores 26 and 27 is set so that when the spool 14 has been moved toward the first end, the first valve bore 26 permits communication between the input port 25 and the communication passage 20, whereas when the spool 14 has been moved toward the second end, the second valve bore 27 permits communication between the release port 24 and the communication passage 20.

The amount of electricity applied to the electrically actuating portion 16 is controlled by a control means 28. The control means 28 is arranged to control the driving force of the electrically actuating portion 16 in accordance with the amount of braking operation detected by the depression force sensor 3.

Thus, the electrically operated actuator 4 ensures that the output hydraulic pressure from the hydraulic pressure supply source 5 is controlled in accordance with the amount of electricity applied to the electrically actuating portion 16 and delivered through the output port 23.

Each of the brake devices $B_{LF}$, $B_{RF}$, $B_{LR}$ and $B_{RR}$ comprises a cylinder 30 and a braking piston 31 slidably received in the cylinder 30 and is constructed to provide a braking force in response to the movement of the braking piston 31 according to the hydraulic pressure applied to a hydraulic braking pressure chamber 32 defined between the cylinder 30 and the braking piston 31.

The normally-opened type solenoid inlet valves $6_{LF}$ and $6_{RF}$ are interposed between the hydraulic braking pressure chambers 32 in the front wheel brake devices $B_{LF}$ and $B_{RF}$ and the output port 23 of actuator 4, respectively, and the normally-closed type solenoid outlet valves $7_{LF}$ and $7_{RF}$ are interposed between the hydraulic braking pressure chambers 32 in the front wheel brake devices $B_{LF}$ and $B_{RF}$ and the reservoir 8, respectively. The normally-opened type solenoid inlet valve $6_R$ is interposed between the hydraulic braking pressure chambers 32 in both rear wheel brake devices $B_{LR}$ and $B_{RR}$ and the output port 23 of actuator 4, and the normally-closed type solenoid outlet valve $7_R$ is interposed between the hydraulic braking pressure chambers 32 in both rear wheel brake devices $B_{LR}$ and $B_{RR}$ and the reservoir 8.

The change-over of the energization and deenergization of the normally-opened type solenoid inlet valves $6_{LF}$, $6_{RF}$ and $6_R$ and the normally-closed type solenoid outlet valves $7_{LF}$, $7_{RF}$ and $7_R$ is controlled by the control means 28. Control means 28 for controlling the electrically actuating portion 16 of the actuator 4 will be described below with reference to FIG. 2.

Figure 2:
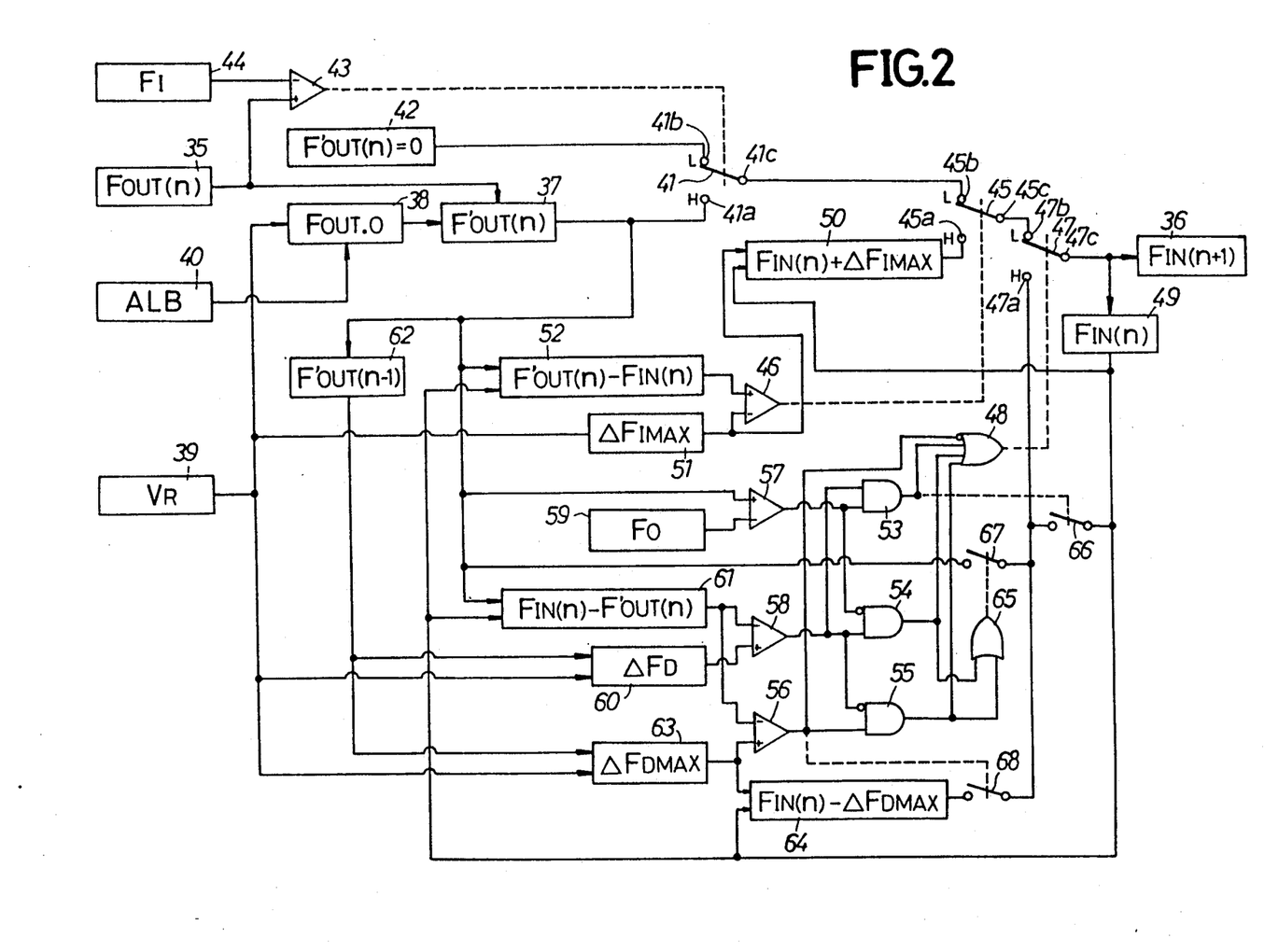
FIG. 2 is a schematic diagram illustrating a portion of the control means.

The control means 28 comprises an input section 35 for receiving an electricity level $F_{OUT(n)}$ corresponding to an electric signal from the depression force sensor 3, i.e., the amount of braking operation, and an output section 36 for producing an applying electricity level $F_{IN(n+1)}$ corresponding to an electricity level to be applied to the electrically actuating portion 16 of the actuator 4, i.e., the output hydraulic braking pressure from the actuator 4, so that the applying electricity level $F_{IN(n+1)}$ controlled in accordance with the braked condition or travelling condition of the vehicle may be applied from the control means 28 to the electrically actuating portion 16 of the actuator 4.

The electricity level $F_{OUT(n)}$ corresponding to the amount of braking operation and received in the input section 35 is supplied to a first arithmetic section 37. In the first arithmetic section 37, a calculation according to the following expression (1) is conducted if the electricity level $F_{OUT(n)}$ corresponding to the amount of braking operation is less than a switchover set value $F_{OUT.O}$ or a calculation according to the following expression (2) is conducted if the electricity level $F_{OUT(n)}$ corresponding to the amount of braking operation is greater than or equal to a switchover set value $F_{OUT.O}$ thereby producing a calculated voltage level $F_{OUT(n)}$.

$$F'_{OUT(n)} = F_{OUT(n)} \quad (1)$$

when $(F_{OUT(n)} < F_{OUT.O})$ $$F'_{OUT(n)} = F_{OUT(n)} + \Theta \times (F_{OUT(n)} - F_{OUT.O}) \quad (2)$$

when $(F_{OUT(n)} \geq F_{OUT.O})$

Figure 3:
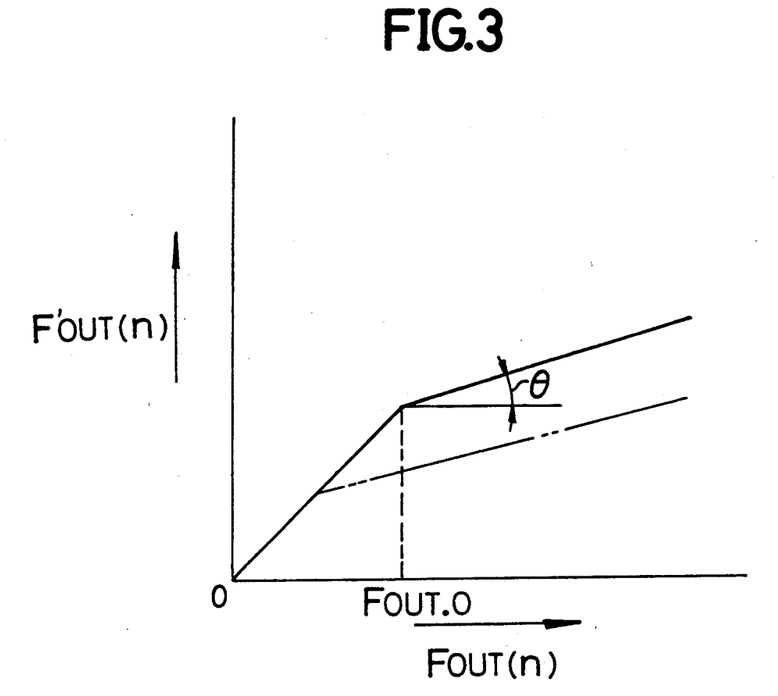
FIG. 3 is a graph illustrating calculated values of different variation rates relative to the amount of braking operation.

More specifically, two types of calculated electricity levels $F'_{OUT(n)}$ with variation rates relative to the electricity level $F_{OUT(n)}$ corresponding to the amount of braking operation being different based on a boundary provided by the switchover set value $F_{OUT.O}$, as shown by the solid line in FIG. 3, are produced from the first arithmetic section 37. When $F'_{OUT(n)} < F_{OUT.O}$, the electricity level $F'_{OUT(n)}$ of the larger variation rate is produced from the first arithmetic section 37, and when $F_{OUT(n)} \geq F_{OUT.O}$, the electricity level $F'_{OUT(n)}$ of the smaller variation rate is produced from the first arithmetic section 37.

Figure 4:
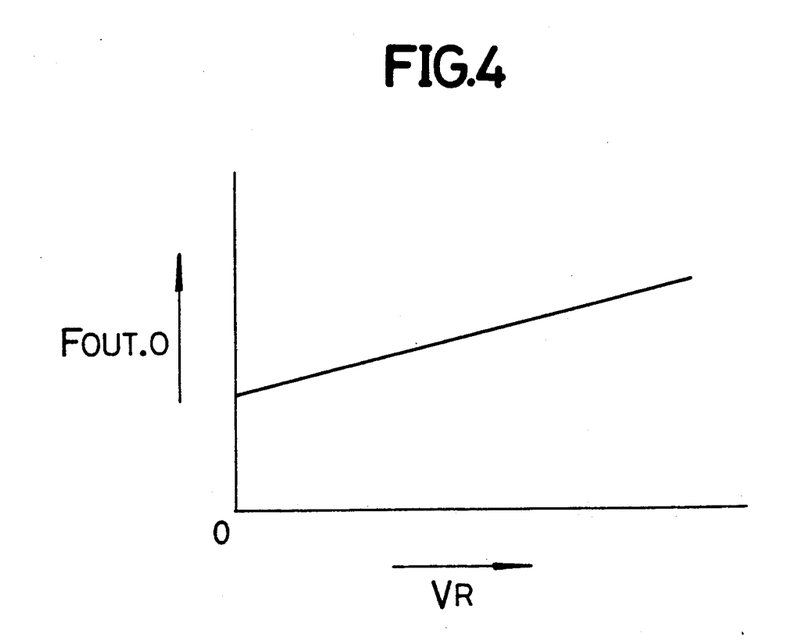
FIG. 4 is a graph illustrating a variation in switchover set value due to the vehicle speed.

The switchover set value $F_{OUT.O}$ is supplied from a braking-operation amount determining section 38 to the first arithmetic section 37. In the braking-operation amount determining section 38, the switchover set value $F_{OUT.O}$ is set as shown in FIG. 4 in accordance with the vehicle speed $V_R$ detected by a vehicle speed detecting section 39. More specifically, the switchover set value $F_{OUT.O}$ is set such that it increases as the vehicle speed $V_R$ increases.

Moreover, when a signal indicative of an anti-lock controlled condition has been applied from an anti-lock control section 40 for operating the anti-lock control valves, i.e., the normally-opened type solenoid inlet valves $6_{LF}$, $6_{RF}$ and $6_R$ and the normally-closed type solenoid outlet valves $7_{LF}$, $7_{RF}$ and $7_R$ on the basis of a decision that a wheel is about to be locked, the braking-operation amount determining section 38 maintains the switchover set value $F_{OUT.O}$ at level assumed when the signal indicative of the anti-lock control section 40 is generated, regardless of the vehicle $V_R$. This ensures that if $F'_{OUT(n)} < F_{OUT.O}$ at the start of the anti-lock control, the calculate electricity level $F'_{OUT(n)}$ produced from the first arithmetic section 37 is as shown by the chain line in FIG. 3 after the start of the anti-lock control.

The output signal from the first arithmetic section 37 is applied to one of separate contacts 41a in a changeover switch 41. The changeover switch 41 comprises a pair of separate contacts 41a and 41b and a common contact 41c. A zero setting section 42 is connected to the other separate contact 41b. In the zero setting section 42, the $F'_{OUT(n)}$ is set at zero $(F'_{OUT(n)} = 0)$.

The changeover switch 41 changes its switching modes in response to an output from a comparator 43. When the output from the comparator 43 is at a high level, the separate contact 41a is electrically connected to the common contact 41c. When the output from the comparator 43 is at a low level, the separate contact 41b is electrically connected to the common contact 41c. The electricity level $F_{OUT(n)}$ corresponding to the amount of braking operation is supplied from the input section 35 to a non-inverted input terminal of the comparator 43, and a set electricity level F1 is supplied from a dead zone determining section 44 to an inverted input terminal of the comparator 43. The dead zone determining section 44 sets, as the set electricity level F1, the maximum electricity level $F_{OUT(n)}$ which corresponds to the amount of braking operation which can be generated due to noises such as a vibration of a vehicle body, in order to avoid the generation of a hydraulic braking pressure as a result of application of the electricity level corresponding to the amount of braking operation due to such noises. Thus, when the electricity level $F_{OUT(n)}$ corresponding to the amount of braking operation exceeds the set electricity level F1, the calculated electricity level $F'_{OUT(n)}$ from the first arithmetic section 37 is delivered from the common contact 41c of the changeover switch 41, and when the electricity level $F_{OUT(n)}$ corresponding to the amount of braking operation is less than or equal to the set electricity level F1, the electricity level of zero from the zero setting section 42 is delivered through the common contact 41c.

The common contact 41c of the changeover switch 41 is connected to a separate contact 45b in a changeover switch 45. The changeover switch 45 comprises a pair of separate contacts 45a and 45b and a common contact 45c. When an output from a comparator 46 is at a high level, the separate contact 45a is electrically connected to the common contact 45c. When the output from the comparator 46 is at a low level, the separate contact 45b is electrically connected to the common contact 45c. The common contact 45c of the changeover switch 45 is connected to a separate contact 47b of a changeover switch 47. The changeover switch 47 comprises a pair of separate contacts 47a and 47b and a common contact 47c. When an output from an OR gate 48 is at a high level, the separate contact 47a is electrically connected to the common contact 47c. When the output from the OR gate 48 is at a low level, the separate contact 47b is electrically connected to the common contact 47c.

The common contact 47c of the changeover switch 47 is connected to the output section 36 and to a first retaining section 49. The first retaining section 49 retains the applying electricity level $F_{IN(n+1)}$ delivered from the output section 36 in only one run of a control cycle. In the immediate control cycle, the applying electricity level $F_{IN(n)}$ at the last control cycle is delivered.

A second arithmetic section 50 is connected to the separate contact 45a of the changeover switch 45. In the second arithmetic section 50, a calculation of $(F_{IN(n)}+\Delta F_{IMAX})$ is carried out. In this calculation, $F_{IN(n)}$ is supplied from the first retaining section 49 to the second arithmetic section 50, and $\Delta F_{IMAX}$ is the maximum increment of the applying electricity level and is supplied from an increase rate setting section 51 to the second arithmetic section 50. More specifically, in the increase rate setting section 51, the maximum increment $\Delta F_{IMAX}$ is set to limit the increase rate of the applying electricity level, at a time when the electricity level corresponding to the amount of braking operation is in an increasing tendency, to a level in which no discomfort is caused to an operator of the vehicle. The maximum increment $\Delta F_{IMAX}$ is determined according to the following expression using the vehicle speed $V_R$ from the vehicle speed detecting section 39.

$$\Delta F_{IMAX} = \Delta F_{IMAX.O} \times (K_1 \times V_R) \quad (3)$$

where $F_{IMAX.O}$ is a reference value and $K_1$ is a coefficient. According to the expression (3), the maximum increment $\Delta F_{IMAX}$ increases as the vehicle speed $V_R$ increases.

The maximum increment $\Delta F_{IMAX}$ obtained in the increase rate setting section 51 is applied to an inverted input terminal of the comparator 46. An increased-speed calculating section 52 is connected to a non-inverted input terminal of the comparator 46. In the increased-speed calculating section 52, a calculation of subtracting the electricity level $F_{IN(n)}$ retained in the first retaining section 49 from the calculated electricity level $F'_{OUT(n)}$ obtained in the first arithmetic section 37 is carried out, thereby providing an increment of the amount of braking operation per unit time. Therefore, the comparator 46 produces a high level signal, thereby permitting the separate contact 45a of the changeover switch 45 to be electrically connected to the common contact 45c, when the increased speed of braking operation exceeds the maximum increment $\Delta F_{IMAX}$. Further, comparator 46 produces a low level signal, thereby permitting the separate contact 45b of the changeover switch 45 to be electrically connected to the common contact 45c, when the increased speed of braking operation is less than or equal to the maximum increment $\Delta F_{IMAX}$.

Outputs from AND gates 53, 54 and 55 are applied in parallel to the OR gate 48, and a signal from the comparator 56 is invertedly applied to the OR gate 48. Thus, the OR gate 48 produces a high level signal when at least one of the AND gates 53, 54 and 55 produces a high level signal, or when the comparator 56 produces a low level signal.

Outputs from comparators 57 and 58 are applied in parallel to the AND gate 53. The calculated electricity level $F'_{OUT(n)}$ is supplied from the first arithmetic section 37 to a non-inverted input terminal of the comparator 57, and a set electricity level Fo is supplied from a minimum hydraulic pressure determining section 59 to an inverted input terminal of the comparator 57. The minimum hydraulic pressure setting section 59 determines a electricity level corresponding to the minimum hydraulic pressure required in the actuator 4 during braking.

A decreased-speed determining section 60 is connected to the non-inverted input terminal of a comparator 58, and a decreased-speed calculating section 61 is connected to the inverted input terminal of the comparator 58. In the decreased-speed setting section 60, a set decreased electricity level $\Delta F_D$, within a range in which the hydraulic braking pressure is not varied, is calculated according to the following expression (4) using the vehicle speed $V_R$ received from the vehicle speed detecting section 39 as well as the calculated electricity level $F'_{OUT(n-1)}$ received from the second retaining section 62, in order to avoid the decrease in hydraulic braking pressure due to a variation in electricity level $F_{OUT(n)}$ corresponding to the amount of braking operation in accordance with a slight variation in force of depression of the brake pedal 1 during braking.

$$\Delta F_D = \Delta F_{DO} \times (K_2 \times V_r) \times (C_1 \times F'_{OUT(n-1)}) \quad (4)$$

where $\Delta F_{DO}$ is a reference value; each of $K_2$ and $C_1$ is a coefficient; and $F'_{OUT(n-1)}$ is a calculated electricity level obtained in the previous control cycle. The second retaining section 62 is connected to the first arithmetic section 37. According to the above expression (4), the set decreased electricity level $\Delta F_D$ increases as the vehicle speed $V_R$ and the amount of braking operation increase.

In the decreased-speed calculating section 61, a calculation of subtracting the calculated electricity level $F'_{OUT(n)}$ obtained in the first arithmetic section 37 from the electricity level $F_{IN(n)}$ retained in the first retaining section 49 is carried out, thereby providing a decrement of the amount of braking operation per unit time. Therefore, the comparator 58 produces a high level signal when the electricity level corresponding to the decreased speed of the amount of braking operation is less than or equal to the set decreased electricity level $\Delta F_D$.

In this manner, the high level signal is produced from the AND gate 53, when $F'_{OUT(n)} > Fo$ and when $(F_{IN(n)} - F'_{OUT(n)}) < \Delta F_D$.

The output signal from the comparator 57 is invertedly applied to the AND gate 54, and the output signal from the comparator 58 is applied to the AND gate 54. Therefore, the AND gate 54 produces a high level signal, when $F'_{OUT(n)} \leq Fo$ and when $(F_{IN(n)} - F'_{OUT(n)}) < \Delta F_D$.

The output signal from the comparator 58 is invertedly applied to the AND gate 55, and the output signal from the comparator 56 is applied to the AND gate 55. The output signal from the decreased-speed calculating section 61 is applied to the inverted input terminal of the comparator 56, and the output signal from a decrease rate determining section 63 is applied to the non-inverted input terminal of the comparator 56. In the decrease rate determining section 63, the maximum decrement $\Delta F_{DMAX}$ larger than the set decreased electricity level $\Delta F_D$ is set in order to limit the decrease rate of applying electricity level at a time when the electricity level corresponding to the amount of braking operation is in a decreasing tendency, to a level in which no discomfort is caused to the operator of the vehicle, and the maximum decrement $\Delta F_{DMAX}$ is determined according to the following expression (5) using the vehicle speed $V_R$ from the vehicle speed detecting section 39 and the calculated electricity level $F'_{OUT(N-1)}$ from the second retaining section 62:

$$\Delta F_{DMAX} = F_{DMAX.O} \times (K_3 \times V_R) \times (C_2 \times F'_{OUT(n-1)}) \quad (5)$$

where $\Delta F_{DMAX.O}$ is a reference value, and each of $K_3$ and $C_2$ is a coefficient. According to the expression (5), the maximum decrement $\Delta F_{DMAX}$ increases as the vehicle speed $V_R$ and the amount of braking operation increase.

Therefore, a high level signal is produced from the comparator 56, when $(F_{IN(n)} - F'_{OUT(n)}) < \Delta F_{DMAX}$, and a high level signal is produced from the AND gate 55, when $\Delta F_D \leq (F_{IN(n)} - F'_{OUT(n)}) < F_{DMAX}$.

The outputs from the first retaining section 49 and the decrease rate determining section 63 are applied to a third arithmetic section 64. In the third arithmetic section 64, a calculation of $(F_{IN(n)} - \Delta F_{DMAX})$ is carried out.

A switch 66 is interposed between the separate contact 47a in the changeover switch 47 and the first retaining section 49 and becomes electrically conducting when the output from the AND gate 53 becomes a high level. A switch 67 is interposed between the separate contact 47a and the first arithmetic section 37 and becomes electrically conducting when the output from the OR gate 65 becomes a high level. Further, a switch 68 is interposed between the separate contact 47a and the third arithmetic section 64 and becomes an electrically conducting when the output from the comparator 56 becomes a high level. The output signal from the AND gates 54 and 55 are applied to the OR gate 65.

Figure 5:
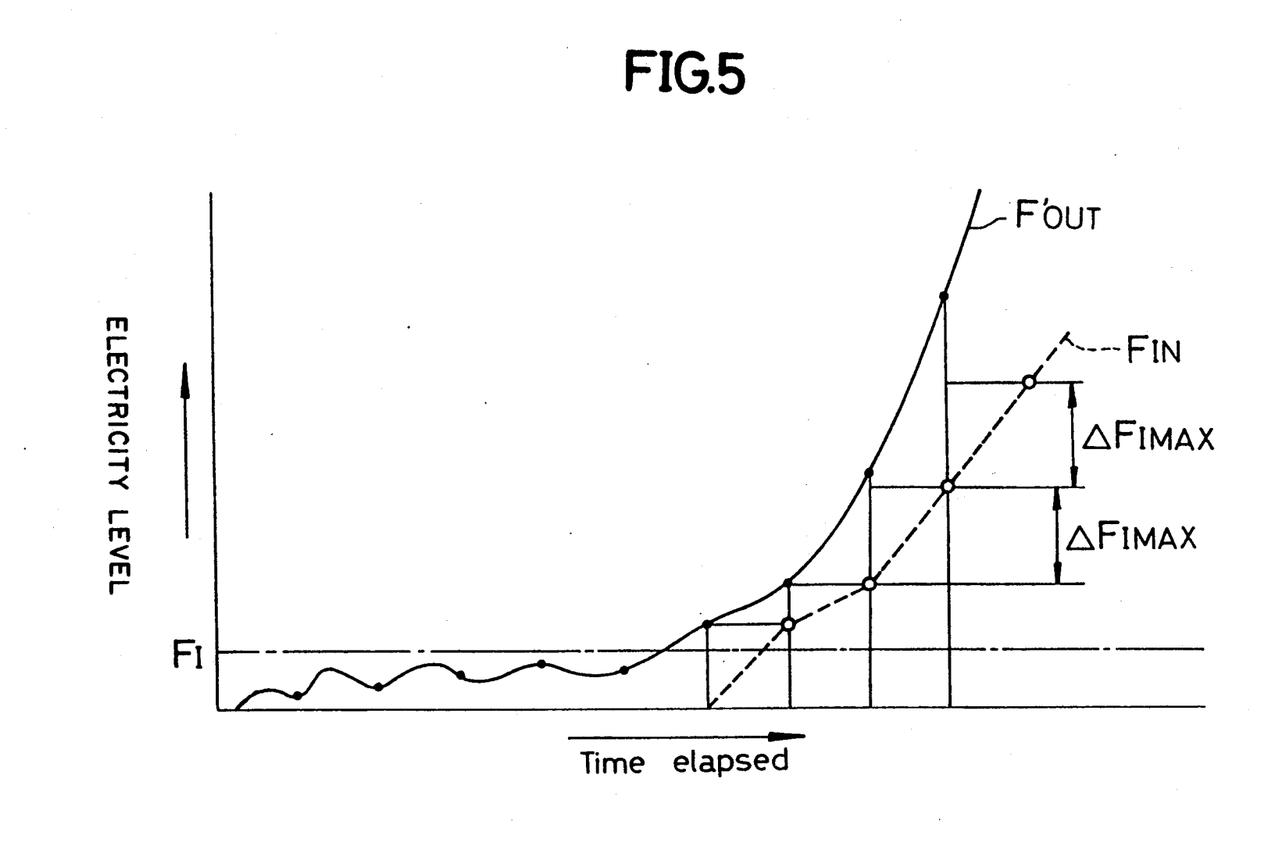
FIG. 5 is a graph illustrating a variation in applying electricity level when the hydraulic braking pressure is increased.

Such control means 28 ensures that when the amount of braking operation is increased from zero, the applying electricity level increases as shown in FIG. 5. More specifically, at the start of braking, the changeover switch 47 is in a state shown in FIG. 2 and until the increase rate of the amount of braking operation exceeds a set value, i.e., the maximum increment $\Delta F_{IMAX}$ set in the increase rate determining section 51, the changeover switch 45 also remains in a state shown in FIG. 2. In this condition, when the electricity level $F_{OUT}$ corresponding to the amount of braking operation is less than or equal to the set electricity level $F_1$ set in the dead zone determining section 44, the changeover switch 41 remains in a state shown in FIG. 2, and the applying electricity level $F_{IN}$ remains zero.

When the electricity level $F_{OUT}$ (corresponding to the amount of braking operation) exceeds the set electricity level $F_I$, the common contact 41c of the changeover switch 41 is electrically connected to the separate contact 41a, so that the calculated electricity level $F'_{OUT}$ calculated in the first arithmetic section 37 is delivered as the applying electricity level $F_{IN}$ from the output section 36.

Then, when the increase rate of the amount of braking operation is increased to a level exceeding the maximum increment $\Delta F_{IMAX}$, the common contact 45c of the changeover switch 45 is electrically connected to the separate contact 45a, so that the applying electricity level $F_{IN}$ becomes a value resulting from sequential addition of the maximum increment $\Delta F_{IMAX}$.

Figure 6:
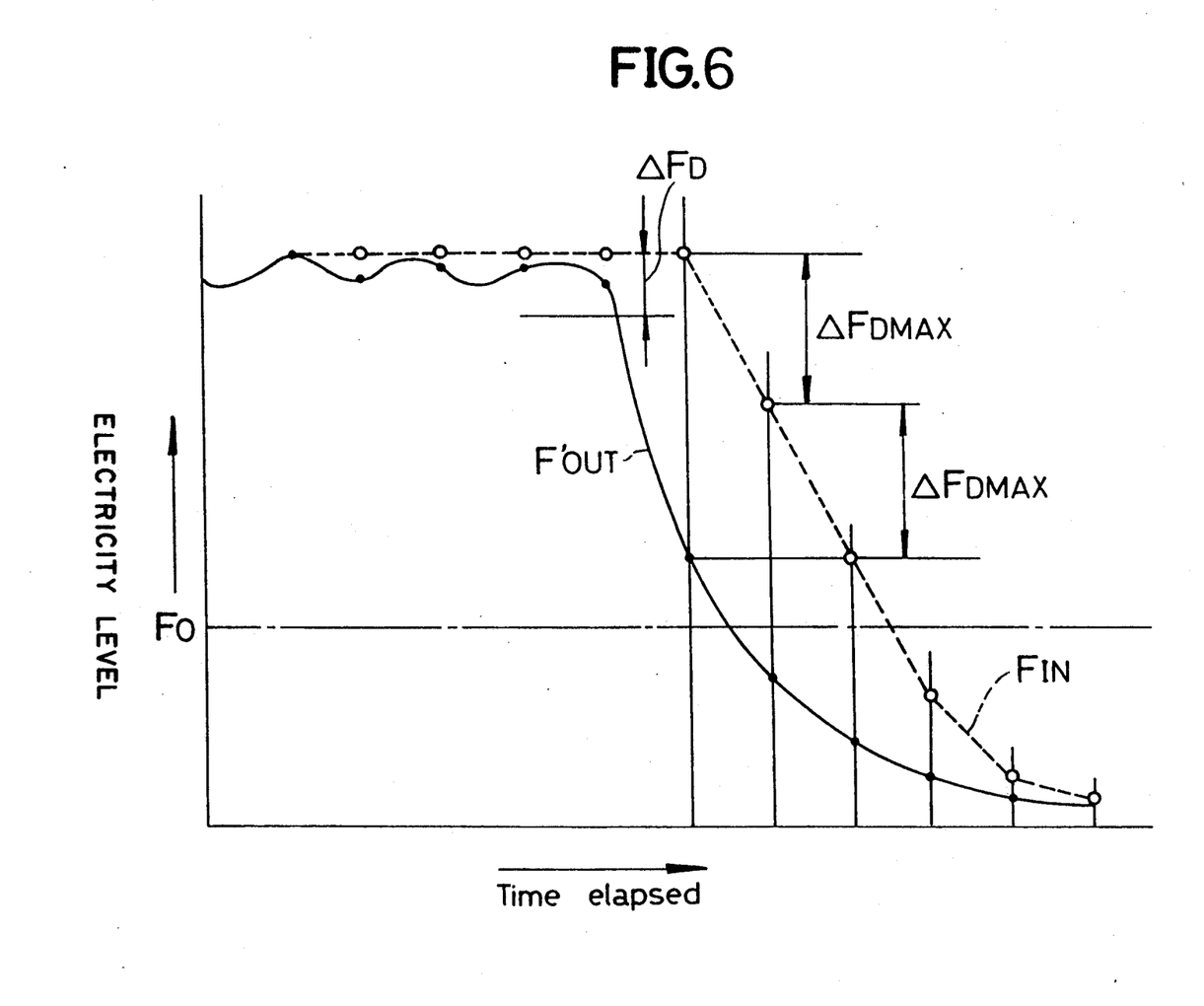
FIG. 6 is a graph illustrating a variation in applying electricity level when the hydraulic braking pressure is decreased.

When the amount of braking operation is decreased, the applying electricity level $F_{IN}$ varies as shown in FIG. 6. More specifically, when the amount of braking operation is decreased, the common contact 47c of the changeover switch 47 is electrically connected to the separate contact 47a. In this condition, the output from the output section 36 varies in response to the changeover of the switching modes of the switches 66, 67 and 68. That is, when $F_{OUT} > Fo$ and $(F_{IN} - F'_{OUT}) < \Delta F_D$, the output from the AND gate 53 becomes a high level, and the output of the first retaining section 49 is delivered from the output section 36, so that the applying electricity level $F_{IN}$ is not varied. When $F'_{OUT} \leq Fo$ and $(F_{IN} - F'hd OUT) < \Delta F_D$, the output from the AND gate 54 becomes a high level and in response thereto, the output from the OR gate 65 becomes a high level, so that an applying electricity level $F_{IN}$, equal to the calculated electricity level $F_{OUT}$ calculated in correspondence to the amount of braking operation, is delivered from the output section 36. When $\Delta F_D \leq (F_{IN} - F'_{OUT}) \leq \Delta F_{DMAX}$, the output from the AND gate 55 becomes a high level and in response thereto, the output from the OR gate 65 becomes a high level, so that the applying electricity level $F_{IN}$, equal to the calculated electricity level $F'_{OUT}$ calculated in correspondence to the amount of braking operation, is delivered from the output section 36. Further, when $(F_{IN} - F'_{OUT}) > \Delta F_{DMAX}$, an electricity level, resulting from subtraction of the maximum decrement $\Delta F_{DMAX}$ from the last applying electricity level $F_{IN}$, is delivered as an applying electricity level $F_{IN}$ from the output section 36 in response to the output from the comparator 56 becoming a high level.

The operation of this embodiment will be described below. In the first arithmetic section 37 in the control means 28, two types of electricity levels of variation rates relative to the amount of depression of the brake pedal 1 or having a braking operation differentiated from each other, are calculated based on a boundary provided by the switchover set value $F_{OUT.O}$. An applying electricity level $F_{IN}$ according to the calculated electricity level $F'_{OUT}$ is applied to the electricity actuating portion 16 of the actuator 4. Therefore, at the start of braking, it is possible to quickly raise the hydraulic braking pressure in response to the braking operation to promptly operate the operating portion in each brake device, and at a point when the amount of braking operation is increased, it is possible to avoid the application of a hydraulic braking pressure more than necessary to the brake devices $B_{LF}$, $B_{RF}$, $B_{LR}$ and $B_{RR}$ in order to provide an improvement in durability and to prevent the consumption of brake fluid (or working oil) from being unnecessarily increased.

Moreover, the switchover set value $F_{OUT.O}$ is set such that it increases in accordance with the vehicle speed $V_R$ and hence, it is possible to accommodate to a variation in inertia force of the vehicle body due to a variation in vehicle speed $V_R$.

Because the switchover set value $F_{OUT.O}$ at the start of the anti-lock control is arranged to be fixed, and the variation rates in applying electricity level $F_{IN}$ relative to the amount of braking operation are differentiated based on a boundary provided by the fixed switchover set value $F_{OUT.O}$, any unnecessarily large hydraulic braking pressure cannot be produced from the actuator 4 during the anti-lock control, and it is likewise possible to provide an improvement in durability and to prevent the consumption of the brake fluid (or working oil) from being unnecessarily increased.

In addition, if the amount of braking operation is greater than or equal to the predetermined value, i.e., the amount of braking operation corresponding to the set electricity level Fo, the applying electricity level $F_{IN}$ is not varied when the electricity level $F_{OUT}$ corresponding to the amount of braking operation applied to the input section 35 has been decreased to a level smaller than the set decreased electricity level $\Delta F_D$. Therefore, it is possible to avoid the decrease in hydraulic braking pressure due to a slight variation in force of depression of the brake pedal 1 during braking, thereby avoiding a chattering of control to enable the hydraulic braking pressure to be reduced only upon a positive decrease in pedal depression force.

Moreover, because the set decreased electricity level $\Delta F_D$ is set such that it increases as the vehicle speed $V_R$ and the amount of braking operation increase, it is possible to accommodate variations in vehicle speed $V_R$ and amount of braking operation.

Further, when the amount of variation in amount of braking operation per unit time exceeds a predetermined value, the amount of variation in applying electricity level $F_{IN}$ is determined at a predetermined value, i.e., when (F'$_{OUT}$−F$_{IN}$) exceeds the maximum increment $\Delta F_{IMAX}$ upon an increase in pressure, the amount of variation in applying electricity level $F_{IN}$ is determined at the maximum increment $\Delta F_{IMAX}$, and when (F$_{IN}$−F'$_{OUT}$) exceeds the maximum decrement $\Delta F_{DMAX}$ upon a decrease in pressure, the amount of variation in applying electricity level $F_{IN}$ is determined at the maximum decrement $\Delta F_{DMAX}$, and in the event other than the above, the applying electricity level $F_{IN}$ is varied in accordance with the amount of braking operation. Therefore, it is possible to avoid any rapid variation in hydraulic braking pressure and thus to prevent any unnecessary increase and decrease in pressure, while preventing any discomfort from being caused to the operator of the vehicle.

Furthermore, it is possible to accommodate variations in vehicle speed $V_R$ and amount of braking operation by the fact that the maximum increment $\Delta F_{IMAX}$ and the maximum decrement $\Delta F_{DMAX}$ have been set such that they increase as the vehicle speed $V_R$ and the amount of braking operation increase.

Figure 7:
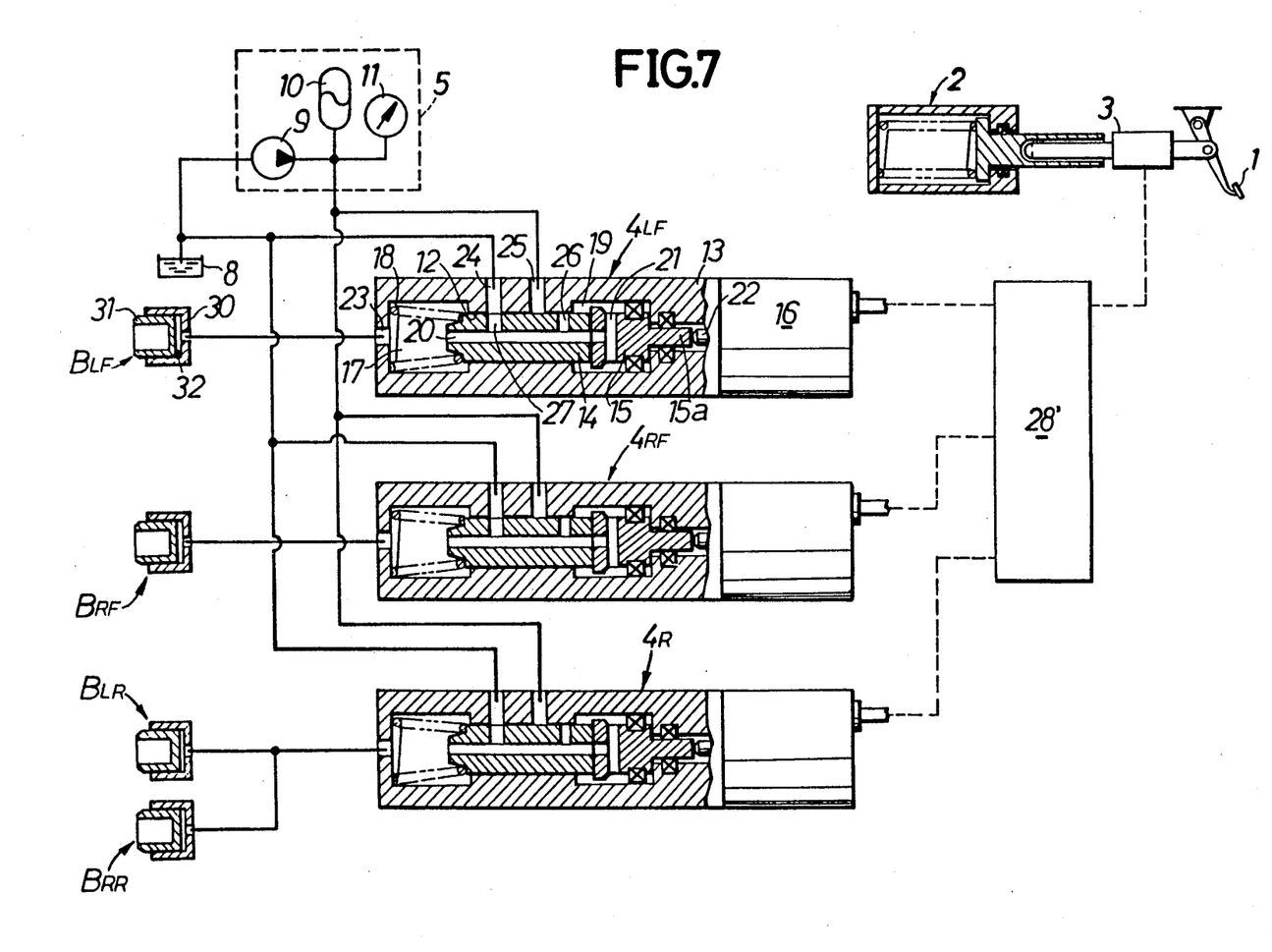
FIG. 7 is a diagram of a hydraulic circuit illustrating a second embodiment of the present invention.

FIG. 7 illustrates a second embodiment of the present invention, wherein components or parts corresponding to those in the above-described first embodiment are identified by the same reference numerals.

Electrically operated actuators $4_{LF}$ and $4_{RF}$ are connected separately to the left and right front wheel brake devices $B_{LF}$ and $B_{RF}$, respectively, and an electrically operated actuator $4_R$ is connected commonly to the left and right rear wheel brake devices $B_{LR}$ and $B_{RR}$. These actuators $4_{LF}$, $4_{RF}$ and $4_R$ are controlled by a control means 28'. In the second embodiment, the normally-opened type solenoid inlet valves $6_{LF}$, $6_{RF}$ and $6_R$ and the normally-closed type solenoid outlet valves $7_{LF}$, $7_{RF}$, and $7_R$ as the anti-lock control valves shown in the first embodiment are omitted the actuators $4_{LF}$, $4_{RF}$ and $4_R$ are of the same construction as the electrically operated actuators 4 shown in FIG. 1.

Even with such an arrangement, it is possible to provide the anti-lock control of each wheel by the independently controlling the individual actuators $4_{LF}$, $4_{RF}$ and $4_R$ by the control means 28'. Moreover, it is possible to provide an effect similar to that of the first embodiment by constructing the control means 28' in an arrangement similar to that of the control means 28 of the first embodiment.

I claim:

1. A method of controlling hydraulic braking pressure in a vehicle, wherein an electrically operated actuator produces a variation rate of a hydraulic braking pressure which varies in response to an applying electricity level applied to the actuator, such that the hydraulic pressure increases as the applying electricity level increases, said method comprising the following steps of:

setting the applying hydraulic pressure in correspondence to an amount of braking operation;
   determining at least two types of hydraulic pressures having different variation rates relative to a variation in an amount of braking operation; and
   changing the applying hydraulic pressure, having a larger variation rate, to an applying hydraulic pressure having a smaller variation rate, when the amount of braking operation is greater than or equal to a switchover set value wherein application of any unnecessarily large hydraulic braking pressure is prevented.

2. The method of claim 1, further comprising the following step of varying the switchover set value to increase as vehicle speed increases wherein said set value varies to correspond to a variation of inertia force.

3. A method of controlling hydraulic braking pressure in a vehicle, wherein an electrically operated actuator produces a variation rate of a hydraulic braking pressure which varies in response to an applying electricity level applied to the actuator, such that the hydraulic pressure increases as the applying electricity level increases, and further wherein an anti-lock control valve is interposed between the actuator and a brake device mounted on a wheel of the vehicle for decreasing the braking pressure of the brake device in response to a determination that the wheel is about to become locked during braking, said method comprising the following steps of;

setting the applying hydraulic pressure in correspondence to an amount of braking operation;

determining at least two types of hydraulic pressures having different variation rates relative to a variation in an amount of braking operation; and changing the applying hydraulic pressure, having a larger variation rate, to an applying hydraulic pressure having a smaller variation rate, in response to the anti-lock control valve when the wheel is about to be locked wherein a large unnecessary increase in hydraulic braking pressure is prevented during anti-lock control.

* * * * *